US009813939B1

(12) United States Patent
Marupaduga et al.

(10) Patent No.: US 9,813,939 B1
(45) Date of Patent: Nov. 7, 2017

(54) MANAGEMENT OF CHANNEL STATE INFORMATION REPORTING RATE IN A COMMUNICATION SYSTEM

(71) Applicant: Sprint Spectrum L.P., Overland Park, KS (US)

(72) Inventors: Sreekar Marupaduga, Overland Park, KS (US); Ryan P. Dreiling, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 78 days.

(21) Appl. No.: 14/933,626

(22) Filed: Nov. 5, 2015

(51) Int. Cl.
*H04W 28/02* (2009.01)
*H04B 7/06* (2006.01)

(52) U.S. Cl.
CPC ...... *H04W 28/0268* (2013.01); *H04B 7/0626* (2013.01); *H04W 28/0257* (2013.01)

(58) Field of Classification Search
CPC ... H04L 1/0026; H04L 1/0027; H04L 1/0687; H04L 1/0693; H04L 5/0057; H04L 49/205; H04L 67/322; H04B 7/0626; H04B 7/0632; H04B 7/0647; H04W 28/0252; H04W 28/0257; H04W 28/0268
See application file for complete search history.

(56) References Cited

U.S. PATENT DOCUMENTS

| 8,670,343 B2 | 3/2014 | Nammi |
| 8,989,124 B1 | 3/2015 | Ramamurthy et al. |
| 9,125,106 B1 | 9/2015 | Velusamy et al. |
| 2012/0008517 A1* | 1/2012 | Imamura ............... H04L 1/0016 370/252 |
| 2012/0275398 A1* | 11/2012 | Chen ...................... H04W 24/10 370/329 |
| 2013/0121270 A1* | 5/2013 | Chen ....................... H04L 5/001 370/329 |

(Continued)

FOREIGN PATENT DOCUMENTS

| WO | WO 2010/019080 A1 | 2/2010 |
| WO | WO 2011/002389 A1 | 1/2011 |
| WO | WO 2011/099906 A1 | 8/2011 |

OTHER PUBLICATIONS

Co-Pending U.S. Appl. No. 14/881,724, filed Oct. 13, 2015, "Management of Channel State Information Reporting Rate in a Communication System".

*Primary Examiner* — Benjamin H Elliott, IV

(57) ABSTRACT

According to aspects of the disclosure, a method and system are provided for managing signaling in a wireless communication network. In some aspects, a base station serves a user equipment device (UE) over an air interface connection between the base station and the UE, and a bearer extends between the UE and a gateway. An example method may involve determining a quality of service (QoS) level of the bearer, and responsively selecting a channel state information (CSI) reporting rate based on the determined QoS level. Further, in some aspects, responsive to the selection of the CSI reporting rate, the method may involve causing the UE to periodically report CSI to the base station according to the selected CSI reporting rate. The method may be performed, in whole or in part, by the UE, the base station, and/or another entity in the wireless communication system.

18 Claims, 4 Drawing Sheets

(56) References Cited

U.S. PATENT DOCUMENTS

| | | | |
|---|---|---|---|
| 2015/0065108 A1* | 3/2015 | Bedekar | H04W 24/02 455/418 |
| 2015/0156780 A1* | 6/2015 | Kim | H04L 5/0035 370/331 |
| 2015/0188681 A1* | 7/2015 | Li | H04W 72/12 370/252 |
| 2015/0304889 A1* | 10/2015 | Qian | H04W 72/1289 370/235 |
| 2015/0333812 A1* | 11/2015 | Breit | H04B 7/0626 370/329 |
| 2016/0029289 A1* | 1/2016 | Wang | H04B 7/155 370/315 |
| 2016/0277256 A1* | 9/2016 | Mismar | H04L 43/02 |

* cited by examiner

MANAGEMENT OF CHANNEL STATE INFORMATION REPORTING RATE IN A COMMUNICATION SYSTEM

BACKGROUND

Unless otherwise indicated herein, the description provided in this section is not itself prior art to the claims and is not admitted to be prior art by inclusion in this section.

In a wireless communication system, a base station may provide one or more coverage areas, such as cells or sectors, in which the base station may serve user equipment devices (UEs), such as cell phones, wirelessly-equipped personal computers or tablets, tracking devices, embedded wireless communication modules, or other devices equipped with wireless communication functionality (whether or not operated by a human user). In general, each coverage area may operate on one or more carriers each defining one or more ranges of frequency spectrum and having a respective "downlink channel" for carrying communications from the base station to UEs and a respective "uplink channel" for carrying communications from the UEs to the base station. Such carriers may be frequency division duplex (FDD), in which the downlink and uplink channels are defined as separate respective ranges of frequency, or time division duplex (TDD), in which the downlink and uplink channels are defined on a common range of frequency but distinguished through time division multiplexing. Further, the downlink channel and uplink channel of each carrier may also be divided into respective sub-channels for carrying particular communications, such as one or more control channels for carrying control signaling and one or more traffic channels for carrying application-layer data and other traffic.

For instance, in a system operating according to an orthogonal frequency division multiple access (OFDMA) protocol, such as the Long Term Evolution (LTE) standard of the Universal Mobile Telecommunications System (UMTS) for example, the air interface is divided over time into frames and sub-frames each defining two slots, and the uplink and downlink channels are each divided over their frequency bandwidth into sub-carriers that are grouped within each slot into resource blocks. When a UE is positioned within coverage of a base station in such a system, the UE may register or "attach" with the base station on a particular carrier on which the base station is configured to provide, and the base station may then schedule particular downlink and uplink resource blocks on that carrier to carry data communications to and from the UE.

In practice, through the attach process and/or subsequently, the base station and supporting LTE network infrastructure may establish for the UE one or more bearers, which define logical communication tunnel(s) for carrying bearer data between the UE and a transport network (e.g., the Internet). Each bearer may have a designated quality of service (QoS) level, which may dictate how a packet data transmission along the bearer is handled by the network. For instance, a bearer could have a relatively high QoS level, according to which network nodes (e.g., the base station, a gateway, etc.) along the bearer path could be set to prioritize routing of data on the bearer over routing of data on other bearers, perhaps to guarantee a particular minimum bit rate, a particular maximum level of packet delay, and/or a particular maximum level of packet loss. Alternatively, a bearer could have a relatively low QoS level, such as a "best efforts" service level, according to which network nodes along the bearer path would simply do their best to route data of the bearer, subject to higher priority handling of other bearer traffic.

In a network such as this, while the base station serves the UE, the base station and UE may modulate their air interface communications at a coding rate selected based on the UE's channel quality, such as with a higher coding rate when the UE has better channel quality and with a lower coding rate when the UE has worse channel quality. Further, while the base station serves the UE, the UE's channel quality may change for a variety of reasons such as, for example, due to channel fading or multipath. To determine the channel quality for a UE, the base station may employ a channel state feedback reporting procedure. For instance, in an LTE system, the UE periodically reports to the base station channel state information (CSI), which includes, among other things, a channel quality indicator (CQI) that takes into account factors such as signal-to-noise ratio, antenna configuration, UE receiver type, and so forth. The UE determines the CSI based, at least in part, on downlink transmissions and the UE reports the CSI to the base station using uplink channels at regular intervals specified by the base station (i.e., according to a specified "CSI reporting rate"). The base station may then determine from the reported CSI a particular modulation and coding scheme (MCS) to use for communication with the UE, and the base station may allocate air interface resources and schedule transmissions of data accordingly. It is thus beneficial for the base station to have accurate and up-to-date information of the prevailing channel quality for a UE so that the base station can make appropriate decisions as to resource allocation and MCS.

OVERVIEW

In a typical wireless communication system, the base station may specify a relatively high CSI reporting rate to served UEs to ensure that it has accurate and up-to-date channel quality information for all UEs in its coverage. Unfortunately, however, this reporting arrangement can give rise to a problem, because the higher the CSI reporting rate, the more significant the uplink signaling overhead becomes for reporting CSI. In practice, a base station may have only a limited extent of uplink resources available to serve UEs (e.g., due to the operator of a wireless communication system having only a limited number of licensed carriers in a given market). Thus, in some scenarios, depending on the number of UEs served by the base station and the specified CSI reporting rate for those UEs, the uplink may become congested.

Generally, when an uplink becomes congested, service may be degraded (e.g., due to latency in allocating uplink resources) and/or the number of UEs served by a base station may be limited. Consequently, it would be desirable to manage CSI reporting on the uplink.

Disclosed herein is a method and system for doing so based, at least in part, on a consideration of a QoS level associated with one or more bearers established for a UE. In particular, the disclosure provides for determining the QoS level for at least one bearer established for the UE and, based on the determined QoS level, selecting a CSI reporting rate for the UE. The disclosure further provides for causing the UE to then periodically report CSI to the base station according to the selected CSI reporting rate. The disclosure thus provides for dynamically setting and/or adjusting a CSI reporting rate for a UE based on QoS level(s) associated with the UE's bearer connection(s).

In some aspects, if the determined QoS level is relatively high, then a relatively high CSI reporting rate may be selected for the UE. Whereas, if the determined QoS level is relatively low, then a relatively low CSI reporting rate may be selected for the UE. This arrangement may help the base station receive CSI reports more often for UEs engaging in high QoS level communications, and thereby facilitate more frequent fine-tuning of communication parameters (e.g., MCS) to account for such UEs' channel conditions. Meanwhile, using a lower CSI reporting rate for UEs engaging in low QoS level communications may help to reduce or avoid congestion on the uplink in some scenarios.

In one respect, disclosed is a method operable in a wireless communication system in which a base station serves a UE over an air interface connection between the base station and the UE, and in which a bearer extends between the UE and a gateway. The method includes determining a QoS level of the bearer and responsively selecting a CSI reporting rate based on the determined QoS level. The method also includes, responsive to the selection of the CSI reporting rate, causing the UE to periodically report CSI to the base station according to the selected CSI reporting rate. The method may be performed, in whole or in part, by the base station, the UE, and/or another entity in the wireless communication system.

In another respect, disclosed is a method operable in a wireless communication system in which (i) a base station serves a UE over an air interface connection between the base station and the UE, (ii) a bearer extends between the UE and a gateway, and (iii) the base station periodically receives, according to a first CSI reporting rate, a report from the UE indicating CSI. The method includes detecting a second bearer extending between the UE and the gateway and, responsive to the detection of the second bearer, determining a second QoS level of the second bearer. The method also includes, responsive to the determination of the second QoS level, selecting a second CSI reporting rate based on the determined second QoS level. The second QoS level may be different than the first QoS level, and the second CSI reporting rate may be different than the first CSI reporting rate. The method may also include, responsive to the determination of the second CSI reporting rate, causing the UE to periodically report CSI to the base station according to the second CSI reporting rate. The method may further include determining that the second bearer was released, and responsively causing the UE to periodically transmit the report according to the first CSI reporting rate again. The method may be performed, in whole or in part, by the base station, the UE, and/or another entity in the wireless communication system.

Still further, in another respect, disclosed is a base station that includes an antenna structure for communicating over an air interface with a UE, and a controller configured to manage communication via the antenna structure over the air interface. The base station provides connectivity between the UE and a gateway over a bearer. The controller is configured to: (i) serve the UE via the air interface, (ii) determine a QoS level of the bearer, (iii) determine a CSI reporting rate based on the determined QoS level, and (iv) responsive to the selection of the CSI reporting rate, cause the UE to periodically report CSI to the base station according to the selected CSI reporting rate.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and apparatus will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
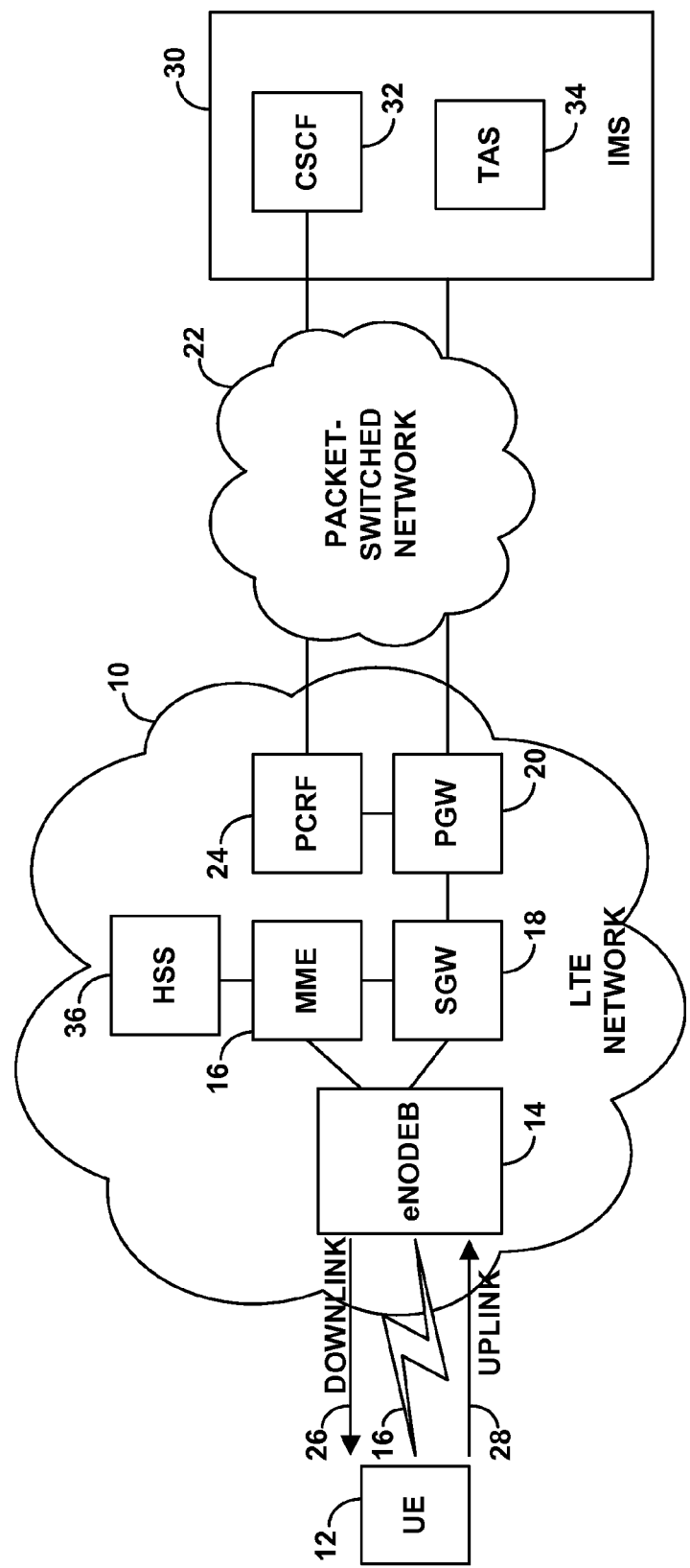
FIG. 1 is a simplified block diagram of a wireless communication system in which the present method and system can be implemented.

Referring to the drawings, as noted above, FIG. 1 is a simplified block diagram of a wireless communication system in which the present method and system can be implemented. In particular, FIG. 1 depicts a representative LTE network 10, which functions primarily to serve UEs (e.g., a representative UE 12) with wireless packet data communication service, including possibly voice-over-packet service, but may also provide other functions. As shown, the LTE network 10 includes a base station (eNodeB) 14, which has an antenna structure and associated equipment for providing an LTE coverage area 16 in which to serve the UE 12. The eNodeB 14 then has a communication interface with a mobility management entity (MME) 16. Further, the eNodeB 14 has a communication interface with a serving gateway (SGW) 18, which in turn has a communication interface with a packet-data network gateway (PGW) 20 that provides connectivity with a packet-switched network 22, and the MME 16 has a communication interface with the SGW 18. The PGW 20 also has a communication interface with a policy and charging rules function (PCRF) 24. In practice, the illustrated components of the LTE network 10 may sit as nodes on a private packet-switched network owned by an operator of the LTE network 10, and thus the various communication interfaces may be logical interfaces through that network.

In this arrangement, MME 16 functions as a signaling controller for the LTE network 10. SGW 18 generally functions as a mobility anchor for bearer services when, for instance, the UE 12 moves between one or more eNodeBs. SGW 18 may also perform various administrative functions including maintaining bearer-service information for the UE 12, including when the UE 12 is in an idle state. As noted above, PGW 20 provides connectivity with the packet-switched network 22. Additionally, PGW 20 generally functions to enforce QoS requirements, approve and/or direct the establishment of bearer services, and filter downlink data into pertinent bearer services. The MME 16 may be communicatively coupled to a Home Subscriber Server (HSS) 36, which may contain various subscription data used to facilitate allocation of bearer services including QoS parameters, by the MME 16. Further, the PCRF 24 may provide QoS authorization (e.g., QoS class identifier and/or bitrates) functions and may ensure that a given QoS is in accordance with a given mobile device's subscription profile.

As illustrated, the air interface of coverage area 16 defines a downlink direction 26 from the eNodeB 14 to the UE 12 and an uplink direction 28 from the UE 12 to the eNodeB 14. Further, the eNodeB 14 and the UE 12 may be configured (e.g., licensed and programmed) to support air interface communication on various particular carriers, which may be FDD or TDD. Each such carrier and/or its particular downlink and uplink channels may be identified by one or more globally unique identifiers per industry standard, so that the eNodeB 14 and a served UE can refer to particular carriers by those identifiers.

According to LTE, each carrier's downlink channel may then define various sub-channels, such as a physical downlink control channel (PDCCH) for carrying scheduling directives and other control signaling from the eNodeB 14 to the UE 12, a physical downlink shared channel (PDSCH) for carrying scheduled downlink data communication, and a reference channel for carrying a reference signal that the UE 12 can monitor to evaluate coverage quality. Likewise, each carrier's uplink channel may define various sub-channels, such as a physical uplink control channel (PUCCH) for carrying scheduling requests, periodic CSI reports, and other control signaling from the UE 12 to the eNodeB 14 and a physical uplink shared channel (PUSCH) for carrying scheduled uplink data communication.

As further shown in FIG. 1, the example arrangement includes an Internet Multimedia Subsystem (IMS) platform 30 accessible via the packet-switched network 22, which functions to support voice over internet protocol (VoIP) call connections such as voice over LTE (VoLTE) calls and other such packet-based real-time media sessions. As shown, the IMS platform includes a Call Session Control Function (CSCF) 32 and a Telephony Application Server (TAS) 34. Further, the CSCF 32 has a communication interface (e.g., via the packet-switched network) with the PCRF 28 of the LTE network 12, to facilitate working with the LTE network to set up VoLTE calls and other sessions for served UEs.

With this arrangement, when the UE 12 enters into coverage of the eNodeB 14, the UE 12 may detect the eNodeB's coverage on a particular carrier, and the UE 12 may engage in an attach process to register with the LTE network 10 on that carrier. For instance, the UE may initially transmit to the eNodeB 14 an attach request, which the eNodeB 14 may pass along to the MME 16, triggering a process of authenticating the UE 12 and establishment of one or more logical bearer connections for the UE 12 between the eNodeB 14 and the PGW 20. As discussed above, each bearer established for the UE 12 may define a logical communication tunnel that includes a radio bearer portion extending between the UE 12 and the eNodeB 14, and an access bearer portion extending between the eNodeB 14 and the PGW 20 via the SGW 18. Further, each bearer established for the UE 12 may have a designated QoS level, which may dictate how the packet data transmission is handled by the LTE network 10.

The QoS level may be characterized by various QoS parameters including, for example, priority, packet delay budget, acceptable packet loss rate, minimum guaranteed bit rate (GBR), and maximum bit rate (MBR), allocation and retention priority (ARP), access point name aggregate maximum bit rate (A-AMBR), UE aggregate maximum bit rate (UE-AMBR), among other such parameters. In some examples, the QoS level may be indicated by a QoS class identifier (QCI), which defines various standardized performance characteristics for a packet communication. For instance, in LTE, QCI values may be indicated by an integer number in a range from 1 to 9, with each QCI number corresponding to a particular type of service such as conversational voice, conversational video, real-time gaming, buffered video streaming, email, chat, etc. An example set of standard QCIs and their characteristics according to the LTE protocol is provided in Table 1 below.

TABLE 1

| QCI | Resource Type | Priority | Packet delay budget (ms) | Packet error loss rate | Example application |
|---|---|---|---|---|---|
| 1 | GBR | 2 | 100 | $10^{-2}$ | Conversational voice |
| 2 | GBR | 4 | 150 | $10^{-3}$ | Conversational video (live streaming) |
| 3 | GBR | 5 | 300 | $10^{-6}$ | Non-conversational video (buffered streaming) |
| 4 | GBR | 3 | 50 | $10^{-3}$ | Real time gaming |
| 5 | Non-GBR | 1 | 100 | $10^{-6}$ | IMS signaling |
| 6 | Non-GBR | 7 | 100 | $10^{-3}$ | Voice, video (live streaming), interactive gaming |
| 7 | Non-GBR | 6 | 300 | $10^{-6}$ | Video (buffered streaming) |
| 8 | Non-GBR | 8 | 300 | $10^{-6}$ | TCP-based (e.g., WWW, e-mail) chat, FTP, p2p file sharing, progressive video |
| 9 | Non-GBR | 9 | 300 | $10^{-6}$ | — |

In Table 1, each QCI is characterized in part by a resource type. The resource type is used to classify bearers into two categories based on the nature of the QoS they provide: (i) a guaranteed bit rate (GBR) bearer and (ii) a non-GBR bearer. For a GBR bearer, the network 10 guarantees a minimum bit rate (or data bandwidth), which may be specified by one or more QoS parameters (e.g., GBR and/or MBR). GBR bearer services are typically used for various high-priority applications including, for example, voice-over IP (VoIP) or video streaming, among other examples. For a non-GBR bearer, the network 10 does not guarantee any particular bit rate. Instead, the network 10 provides a best effort service for data packets on a non-GBR bearer. Non-GBR bearer services are typically used for relatively low-priority applications including, for example, web browsing, email, or FTP transfer, among other examples.

In practice, during the attach process, the network 10 initially establishes for the UE 12 one or more "default" bearers to enable the UE 12 to engage in certain basic communications, with each default bearer having a respective QoS level. The default bearer(s) remain established as long as the UE 12 remains attached to the eNodeB 14. This may allow the LTE network 10 to provide the UE 12 with an always-on IP connectivity to the packet-switched network 22. In LTE, the default bearer(s) are typically non-GBR bearers and may thus have QCI level between 5 and 9.

During the attach process, the UE 12 may transmit an attach request to the eNodeB 14. In response, the eNodeB 14 may signal the MME 16, and the MME 16 may then control setup of each default bearer through a process that would include signaling between the MME 16 and the eNodeB 14, signaling between the eNodeB 14 and the UE 12, signaling between the MME 16 and the SGW 18, signaling between the SGW 18 and the PGW 20, and/or signaling between the PGW 20 and the PCRF 24. Further during this process, the eNodeB 14 (and perhaps other LTE network 10 entities) may store in memory a context record for the UE 12 including, among other things, an indication of the default bearer(s) established for the UE 12 and the QCI level associated with each default bearer. The UE 12 may also store a context record including, among other things, an indication of the default bearer(s) and the QCI level associated with each default bearer, so that the UE 12 can then be served by the eNodeB 14 per that context record. Accordingly, the elements of network 10 (e.g., the eNodeB 14, the MME 16, etc.) and the UE 12 may be aware of the bearer(s) established for the UE 12 and the QCI level associated with each bearer established for the UE 12.

During or after completion of the attach process, the LTE network 10 may also establish for the UE 12 additional bearers (referred to as "dedicated" bearers) responsive to a service request by the UE 12 or the IMS 30 or in other situations. A dedicated bearer can be a GBR bearer or a non-GBR bearer and, thus, a dedicated bearer may be assigned any QCI level between 1 and 9. The network 10 may establish a dedicated bearer for the UE 12, for example, in a scenario in which the QoS desired and/or required for some traffic is different than the QoS given by the UE's default bearer(s). Upon establishing a dedicated bearer for the UE 12, the context records stored in the eNodeB 14 and the UE 12 may be updated to reflect the newly added bearer and the QCI associated with that bearer. Additionally, once a session on the dedicated bearer is completed, the dedicated bearer can be released by the network 10 and the context records of the eNodeB 14 and UE 12 can be further updated accordingly.

By way of example, the network 10 may initially establish for the UE 12 a default Internet bearer with a best-efforts QoS, for use by the UE 12 to engage in general Internet communications such as web browsing, e-mail messaging, and the like. Further, if the UE 12 subscribes to VoIP service or another such service that would be served by the IMS 30, the network 10 may initially establish for the UE 12 a default IMS signaling bearer with a medium QoS, for use by the UE 12 to engage in session setup signaling (such as Session Initiation Protocol (SIP) signaling) with the IMS 30 to facilitate setup of VoIP calls or the like. If the UE then engages in signaling over the default IMS signaling bearer to setup a packet-based real-time media session (e.g., VoIP call), the network 10 may then establish for the UE 12 a dedicated IMS bearer for carrying media content of the session. The dedicated IMS bearer may, for instance, have a high QoS for carrying VoIP voice packets to and from the UE 12. Once the dedicated IMS bearer is established, the UE 12 may then send and receive media content of the session over that dedicated IMS bearer.

In line with the discussion above, while the eNodeB 14 serves the UE 12, the UE 12 may periodically determine its channel quality based on downlink transmissions (e.g., downlink reference signal strength) and perhaps one or more other factors (e.g., UE's capabilities), and the UE 12 may periodically transmit to the eNodeB 14 (on the PUCCH) a CSI report including a CQI that indicates the UE's determined channel quality, a pre-coding matrix indicator (PMI), and/or a rank indicator (RI). Using a standard CQI-MCS mapping table that maps CQI to MCS, the eNodeB 14 may then determine from the CQI reported for a given carrier which MCS to use for communicating bearer data with the UE on that carrier, and the eNodeB 12 may allocate air interface resources accordingly.

Further, in line with the discussion above, the UE 12 periodically transmits the CSI report(s) to the eNodeB 14 on the PUCCH according to a CSI reporting rate specified by the eNodeB 14. The eNodeB 14 may specify the CSI reporting rate in one or more operational parameters provided to the UE 12 to facilitate operation of the UE 12 in its coverage area. For example, the eNodeB 14 may specify a CSI reporting rate via operational parameters CQI-PMI-ConfigIndex and/or RI-ConfigIndex, which determine how often the UE 12 reports CQI and PMI on the PUCCH and how often the UE 12 reports RI on the PUCCH, respectively.

In some aspects, the eNodeB 14 may provide operational parameters to the UE 12 in a broadcast message, such as a system parameter message or system information block (e.g., a LTE System Block #8 (SIB8) information) that the eNodeB 14 broadcasts generally for its served UEs (including the UE 12) to receive. In additional or alternative aspects, the eNodeB 12 may provide operational parameters to the UE 12 in control messages transmitted specifically to the UE 12, such as in RRC messages for instance. The UE 12 may thus be configured to monitor for communications from the eNodeB 14 to read broadcast and/or control messages so as to receive and then operate in accordance with the specified operational parameters, including the specified CSI reporting rate.

As noted above, the disclosure provides for dynamically managing the CSI reporting rate for a UE based on the QoS level of one or more bearers established for the UE. This process can be carried out by the eNodeB 14 itself and/or by one or more other network entities, such as with portions of the analysis carried out by an entity outside of the eNodeB 14 (e.g., the MME 16 or the UE 12) and the eNodeB 14 then responsively causing the UE to report CSI according to the analysis. For simplicity, however, the process will be described here in a scenario where the eNodeB 14 carries out all aspects of the process.

The eNodeB 14 may determine the QoS level for the one or more bearers in a number of ways. For example, the eNodeB 14 may determine the QoS level for the bearer(s) from the context record maintained by the eNodeB 14 for the UE 12. As described above, the context record can include a listing of the bearer(s) established for the UE 12 and an indication of the respective QoS level associated with each bearer. Additionally or alternatively, for example, the eNodeB 14 may learn the QoS level of a given bearer as part of the signaling that occurs within the network 10 to establish that bearer. Other examples may also be possible.

Once the eNodeB 14 determines the QoS level for each bearer of the UE 12, the eNodeB 14 may then select a CSI reporting rate for the UE based on the determined QoS level. To do this, the eNodeB 14 may include or have access to a table that maps various QoS levels to corresponding CSI reporting rates, and the eNodeB 14 may be programmed to refer to that table to select the CSI reporting rate that will be utilized by the UE 12 for reporting CSI.

For example, the table may map QCI levels to corresponding CSI reporting rates. In some implementations, each QCI level may correspond with a different CSI reporting rate. For instance, the table may include nine different CSI reporting rates that are each mapped to a respective one of the nine standardized QCI levels in LTE. In other implementations, the table may map the QCI levels to between two and eight different CSI reporting rates. Thus, in such implementations, two or more of the QCI levels may correspond with the same CSI reporting rate. Other examples may also be possible.

In additional or alternative examples, the table can map other QoS parameters to corresponding CSI reporting rates. For instance, the table can map QoS parameters such as QCI, priority, packet delay budget, acceptable packet loss rate, GBR, MBR, ARP, A-AMBR, UE-AMBR, or combinations thereof to corresponding CSI reporting rates. Other examples may also be possible.

In some aspects, the table may be configured to map relatively high QoS levels to relatively high CSI reporting rates and relatively low QoS levels to relatively low CSI reporting rates. This may help the eNodeB 14 receive CSI reports more often for UEs engaging in high QoS level communications, and thereby facilitate more frequent fine-tuning of communication parameters (e.g., MCS) to account for such UEs' channel conditions. Meanwhile, using a lower CSI reporting rate for UEs engaging in low QoS level communications may help to reduce or avoid congestion on the uplink in some scenarios. As one example, the table may map QCI levels between 1 and 4, which indicate a GBR bearer, to higher CSI reporting rates than are mapped to QCI levels between 5 and 9, which indicate a non-GBR bearer.

In some alternative implementations, instead of using a table, the eNodeB 14 can select the CSI reporting rate by simply determining whether the QoS level of a bearer indicates that the bearer is a GBR bearer or a non-GBR bearer. For instance, the eNodeB 14 can determine that a bearer is a GBR bearer by determining that the bearer has a QCI level between 1 and 4, and the eNodeB 14 can determine that the bearer is a non-GBR bearer by determining that the bearer has a QCI level between 5 and 9 (as indicated in Table 1 above). If the eNodeB 14 determines that the bearer is a GBR bearer, the eNodeB 14 can select a first CSI reporting rate. Whereas, if the eNodeB 14 determines that the bearer is a non-GBR bearer, the eNodeB 14 can select a second CSI reporting rate. In some examples, the first CSI reporting rate can be higher than the second CSI reporting rate.

As noted above, in some instances, a UE may have multiple bearers at a given time, and at least one of the bearers may have a different QoS level than another of the bearers. For example, at a given time, the UE may have one or more default bearer connections with the network 10 and perhaps one or more dedicated bearer connections with the network 10 as well. The eNodeB 14 can be configured to select the CSI reporting rate in scenarios where the UE has multiple bearers at a given time.

In some implementations, the eNodeB 14 may be configured to determine which of the multiple bearers has the highest QoS level and then use that highest QoS level in connection with a mapping table. In other words, bearers having lower QoS levels may not be considered by the eNodeB 14 to select the CSI reporting rate for the UE in such implementations. In additional or alternative implementations, the table may be configured to map the QoS levels of multiple bearers (i.e., combinations of QoS levels) to CSI reporting rates. For instance, the table may indicate that a UE having a first bearer connection with QCI 1 and a second bearer connection with QCI 8 should have a different CSI reporting rate than a UE having only a single bearer connection with QCI 1 or a UE having a first bearer connection with QCI 1 and a second bearer connection with QCI 3. Other example implementations for selecting the CSI reporting rate when a UE has multiple bearer connections may also be possible.

Once the eNodeB 14 determines the CSI reporting rate for the UE based on the QoS level of the one or more bearers, the eNodeB 14 then causes the UE 12 to periodically report its CSI in accordance with the selected CSI reporting rate. To do so, the eNodeB 14 may transmit an RRC connection reconfiguration message to the UE 12 specifying the determined CSI reporting rate. For example, the eNodeB 14 may specify the determined CSI reporting rate by providing values for operational parameters CQI-PMI-ConfigIndex and/or RI-ConfigIndex in the RRC messages. The UE 12 may monitor for such RRC messages from the eNodeB 14 so as to receive and then operate in accordance with the determined CSI reporting rate.

While the eNodeB 14 serves the UE 12, the UE's 12 bearer connections may change for various reasons. For example, the network 10 may initially establish one or more default bearers for the UE 12 during the attach process and then, during the attach process or subsequently, the network 10 may establish additional dedicated bearers for the UE 12. Further, once a communication session on a dedicated bearer is complete, the network 10 may release the dedicated bearer. The dedicated bearers that are established and released for the UE 12 may have different QoS levels than the default bearers (and/or other dedicated bearers established for the UE 12). As a result, the QoS levels associated with the UE's 12 bearer connections may change while the eNodeB 14 serves UE 12.

According to aspects of the disclosure, the eNodeB 14 can detect such changes and the UE 12 can dynamically adjust the CSI reporting rate for the UE 12 in response. For example, the eNodeB 14 can detect that a dedicated bearer has been newly established or released for the UE 12 based on the signaling that occurs in the network 10 during the processes of establishing or releasing the dedicated bearer, and/or based on the context record maintained by the eNodeB 14 for the UE 12. The eNodeB 14 can also determine the QoS level of the newly established or released dedicated bearer in the same way. Responsive to the eNodeB 14 detecting a change to the UE's 12 bearer connections and/or QoS levels, the eNodeB 14 may perform the CSI reporting rate selection process described above. That is, the eNodeB 14 may utilize the detection of such changes as a trigger condition for carrying out the CSI reporting rate selection processes of the disclosure. Thus, in some aspects, the eNodeB 14 may monitor for changes to its served UEs' bearer connections and/or QoS levels so as to determine when to perform the CSI reporting rate selection process for the UEs it serves.

Figure 2:
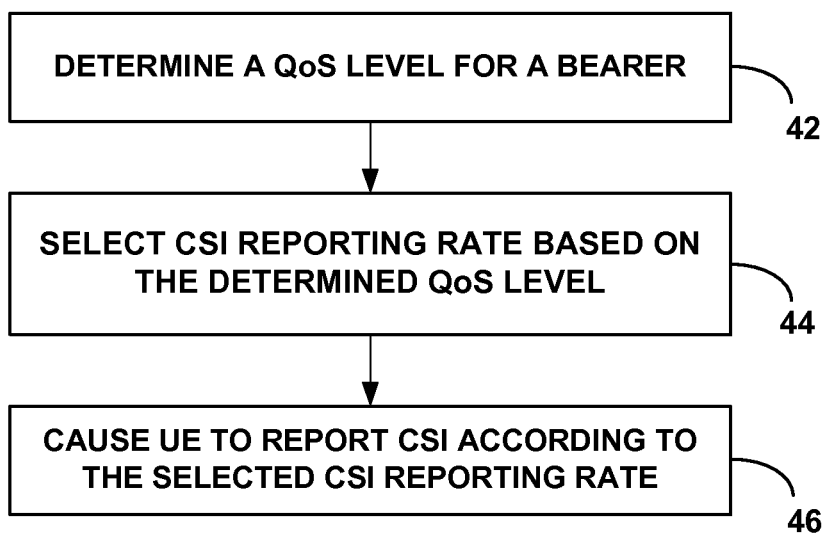
FIG. 2 is a flow chart depicting example operations in accordance with the disclosure.

FIG. 2 is next a flow chart depicting an example set of operations that can be carried out in an implementation of the process according to some aspects of the disclosure. In the illustrated example, the process relates to a scenario in which a base station (e.g., eNodeB 14) is serving a UE through an air interface connection between the base station and the UE, and at least one bearer extends between the UE and a gateway (e.g., PGW 20) via the base station. As shown in FIG. 2, at block 42, the process begins with the base station determining a QoS level of the at least one bearer. At block 44, responsive to the determination at block 42, the base station selects a CSI reporting rate based on the determined QoS level. At block 46, the base station causes the UE to periodically report CSI to the base station according to the selected CSI reporting rate.

Although the operations illustrated in FIG. 2 are described as being performed by the base station, some or all of the operations at blocks 42, 44, and 46 may be performed by the UE and/or another entity in the network 10 according to alternative examples. In one alternative example, the UE may determine the QoS level at block 42, select the CSI reporting rate at block 44, and then periodically report CSI according to the selected CSI reporting rate at block 46. For instance, at block 42, the UE may determine the QoS level of one or more bearers based on the context record maintained by the UE and/or based on signaling that the UE engages in to establish the bearer(s). At block 44, the UE may then select the CSI reporting rate based on the determined QoS level in a manner similar to that described above with respect to the base station. For instance, the UE can include or have access to a table that maps QoS levels to corresponding CSI reporting rates, and the UE can be programmed to refer to that table to select the CSI reporting rate. In some examples, causing the UE to report CSI according to the selected CSI reporting rate at block 46 may include the UE communicating the selected CSI reporting rate to the base station and then the UE periodically reporting the CSI according to the selected CSI reporting rate. In other examples, at block 46, the UE may periodically report CSI according to the selected CSI reporting rate without notifying the base station that the UE changed its CSI reporting rate. This may help to conserve base station processing power, for instance. Other examples of the UE carrying out the process illustrated in FIG. 2 are also possible.

In some aspects, the method shown in FIG. 2 can be implemented during an initial attach process during which the UE registers with a network (e.g., the LTE network 10). In such implementations, the at least one bearer can include at least one default bearer. In additional or alternative aspects, the method shown in FIG. 2 can be implemented after the initial attach process. Thus, the at least one bearer can additionally or alternatively include one or more dedicated bearers.

Figure 3:
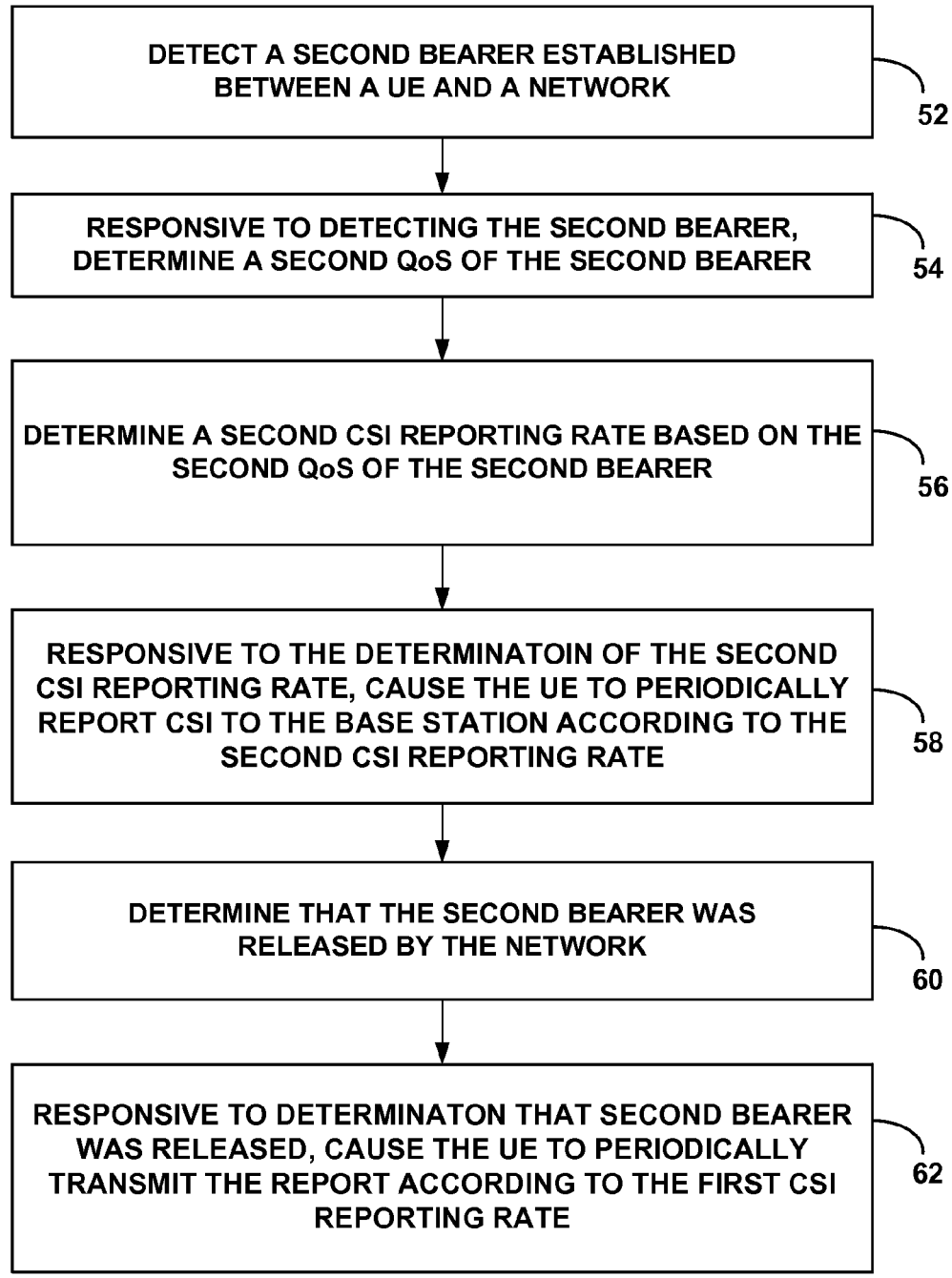
FIG. 3 is another flow chart depicting example operations in accordance with the disclosure.

FIG. 3 is next a flow chart depicting another example set of operations that can be carried out in an implementation of this process. In the illustrated example, the process relates to a scenario in which the base station (e.g., eNodeB 14) is serving a UE through an air interface connection between the base station and the UE, and a first bearer extends between the UE and a gateway (e.g., PGW 20) via the base station. Also, in this scenario, the base station periodically receives, according to a first CSI reporting rate, a report from the UE indicating CSI.

As shown in FIG. 3, at block 52, the process begins with the base station detecting a second bearer established between the UE and the gateway. For example, the base station can detect the second bearer has been established for the UE based on the signaling that occurs in the network during the processes of establishing the second bearer. In additional or alternative examples, the base station can detect that the second bearer has been established based on the context record maintained for the UE. At block 54, responsive to the detection of the second bearer, the base station determines a second QoS level of the second bearer. The second bearer has a second QoS level that is different than the first QoS level. In one implementation, the second bearer may be a dedicated bearer and the first bearer may include one or more default and/or dedicated bearers.

At block 56, the base station determines a second CSI reporting rate based on the second QoS level. The second CSI reporting rate may be different than the first CSI reporting rate. In one example, the second QoS level may be higher than the first QoS level, and the second CSI reporting rate may be higher than the first CSI reporting rate. At block 58, responsive to the determination of the second CSI reporting rate, the base station may cause the UE 12 to periodically report CSI to the base station according to the second CSI reporting rate. At block 60, the base station determines that the second bearer was released by the network 10. At block 62, responsive to the determination that the second bearer was released, the base station causes the UE to periodically transmit the report according to the first CSI reporting rate.

Although the process illustrated in FIG. 3 is described as being carried out by the base station, some or all aspects of the process can be carried out by the UE and/or another entity in a wireless communication system in other examples. In one alternative example, the process may be carried out by the UE. For instance, at block 52, the UE may detect the second bearer based on the UE's context record and/or signaling that the UE engages in to establish the second bearer. At block 54, the UE may determine the second QoS level of the second bearer based on the UE's context record and/or the signaling that the UE engages in to establish the second bearer. At block 56, the UE may then select the second CSI reporting rate based on the determined second QoS level (e.g., using a table that maps QoS levels to corresponding CSI reporting rates). At block 58, the UE may periodically report CSI according to the selected second CSI reporting rate. In some implementations, the UE may notify the base station of the change from the first CSI reporting rate to the second CSI reporting rate. In alternative implementations, the UE may not provide such notification to the base station. At block 60, the UE may determine that the second bearer was released (e.g., based on the UE's context record and/or signaling that the UE engages in to release the second bearer). At block 62, the UE may periodically report CSI according to the first CSI reporting rate. In some implementations, the UE may notify the base station of the change from the second CSI reporting rate to the first CSI reporting rate. In other implementations, the UE may not provide such notification to the base station. Other examples of the UE carrying out the process illustrated in FIG. 3 are also possible.

Figure 4:
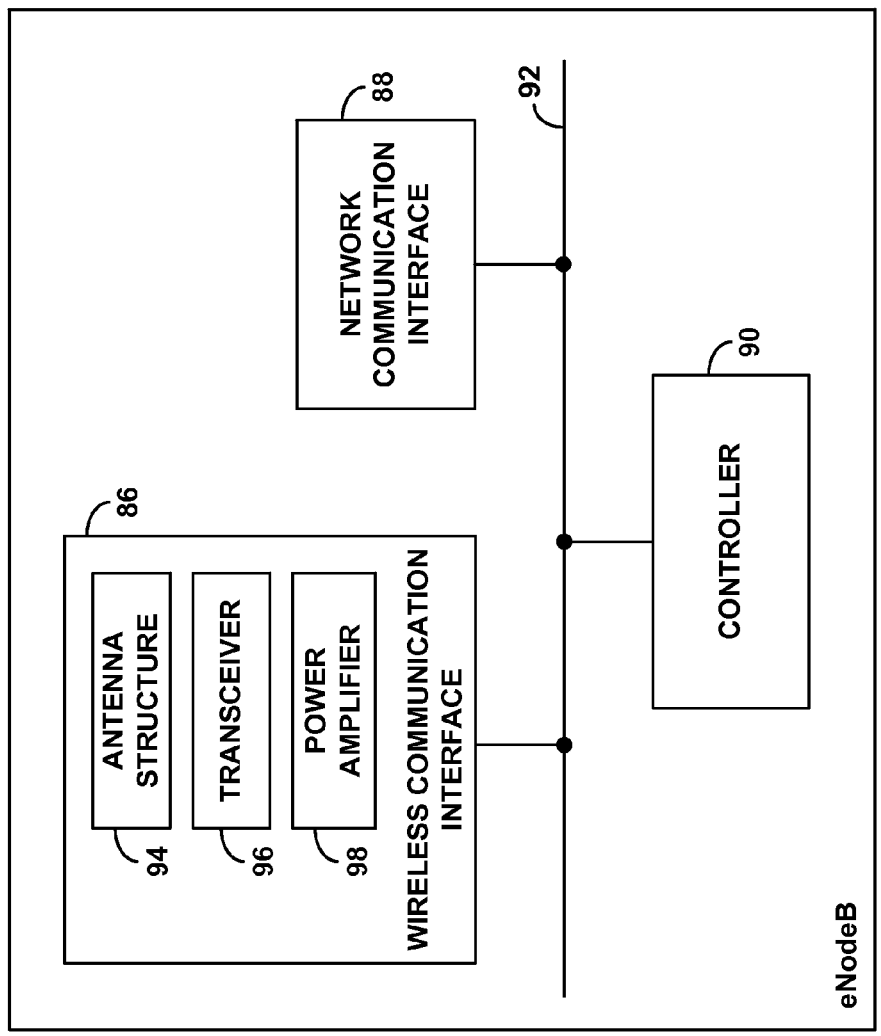
FIG. 4 is a simplified block diagram of an example base station operable in accordance with the disclosure.

FIG. 4 is a simplified block diagram of an example eNodeB (e.g., macro eNodeB, small cell, or other type of base station), showing some of the components that such a device may include in order to carry out these and other operations. As shown, the example eNodeB includes a wireless communication interface 86, a network communication interface 88, and a controller 90, all of which can be integrated together in various ways or, as shown, interconnected with each other through a system bus, network, or other connection mechanism 92.

Wireless communication interface 86 includes an antenna structure (e.g., one or more antennas or antenna elements) 94, which can be tower mounted or provided in some other manner, configured to transmit and receive over the air interface and thereby facilitate communication with served UEs. Further, the wireless communication interface includes a transceiver 96 and power amplifier 98 supporting air interface communication according to the LTE protocol. Network communication interface 88 may then comprise one or more wired and/or wireless network interfaces (such as an Ethernet interface) through which the eNodeB may transmit and receive data over a backhaul connection with SGW 18 as discussed above.

Controller 90, which may be integrated with wireless communication interface 86 or with one or more other components of the eNodeB, may then be configured to manage communication over the air interface, including managing CSI reporting on an uplink. By way of example, controller 90 may be configured to (i) serve the UE via the air interface, (ii) determine a QoS level of a bearer established for the UE, (iii) responsive to the determination of the QoS level, determine a CSI reporting rate based on the determined QoS level, and (iv) responsive to the selection of the CSI reporting rate, cause the UE to periodically report CSI to the eNodeB according to the selected CSI reporting rate.

Controller 90 can be implemented using hardware, software, and/or firmware. For example, controller 90 can include one or more processors and a non-transitory computer readable medium (e.g., volatile and/or non-volatile memory) that stores machine language instructions or other executable instructions. The instructions, when executed by the one or more processors, may cause controller 90, and thus the eNodeB, to carry out the various base station operations described herein.

FIGS. 2-3, described by way of example above, represent processes that correspond to at least some instructions executed by the controller 90 in FIG. 4 to perform the above described functions associated with the described concepts. It is also within the scope and spirit of the present concepts to omit steps, include additional steps, and/or modify the order of steps presented above.

Exemplary embodiments have been described above. Those skilled in the art will understand, however, that changes and modifications may be made to these embodiments without departing from the true scope and spirit of the invention.

What is claimed is:

1. In a wireless communication system in which a base station serves a user equipment device (UE) over an air interface connection between the base station and the UE, and in which a bearer extends between the UE and a gateway, a method, performed at the base station, comprising:
   determining a quality of service (QoS) level of the bearer;
   selecting, based on the determined QoS level, a channel state information (CSI) reporting rate; and
   responsive to selecting the CSI reporting rate, causing the UE to periodically report CSI to the base station according to the selected CSI reporting rate.

2. The method of claim 1, wherein the base station determines the QoS level and selects the CSI reporting rate based on the determined QoS level.

3. The method of claim 1, wherein selecting the CSI reporting rate based on the determined QoS level comprises:
   determining, based on the QoS level, whether the bearer is a guaranteed bit rate (GBR) bearer or a non-guaranteed bit rate (non-GBR) bearer;
   responsive to a determination that the bearer is a GBR bearer, selecting a first CSI reporting rate as the CSI reporting rate; and
   responsive to a determination that the bearer is a non-GBR bearer, selecting a second CSI reporting rate as the CSI reporting rate, wherein the second CSI reporting rate is different than the first CSI reporting rate.

4. The method of claim 3, wherein the first CSI reporting rate is higher than the second CSI reporting rate.

5. The method of claim 1, wherein the QoS level comprises a QoS class identifier (QCI) and selecting the CSI reporting rate comprises:
   determining the QCI of the bearer; and
   selecting the CSI reporting rate from among a plurality of CSI reporting rates based on the determined QCI.

6. The method of claim 1, further comprising determining the QoS level from a context record associated with the UE.

7. The method of claim 1, wherein the bearer comprises a plurality of bearers having a plurality of QoS levels, and wherein selecting the CSI reporting rate comprises:
   determining a highest QoS level from among the plurality of QoS levels; and
   selecting the CSI reporting rate based on the determined highest QoS level.

8. The method of claim 1, wherein causing the UE to periodically report CSI to the base station according to the selected CSI reporting rate comprises transmitting, by the base station to the UE, a RRC connection reconfiguration message including an operational parameter indicating the selected CSI reporting rate.

9. The method of claim 1, wherein the CSI includes information selected from the group consisting of a channel quality indicator (CQI), a precoding matric indicator (PMI), and a rank indicator (RI).

10. In a wireless communication system in which (i) a base station serves a user equipment device (UE) over an air interface connection between the base station and the UE, (ii) a first bearer having a first quality of service (QoS) level extends between the UE and a gateway, and (iii) the base station periodically receives, according to a first channel state information (CSI) reporting rate, a report from the UE indicating CSI, a method, performed at the base station, comprising:
   detecting a second bearer extending between the UE and the gateway;
   responsive to detecting the second bearer, determining a second QoS level of the second bearer, wherein the second QoS level is different than the first QoS level;
   selecting a second CSI reporting rate based on the second QoS level, wherein the second CSI reporting rate is different than the first CSI reporting rate; and
   responsive to determining the second CSI reporting rate, causing the UE to periodically report CSI to the base station according to the second CSI reporting rate.

11. The method of claim 10, wherein the base station determines the second QoS level and selects the second CSI reporting rate based on the second QoS level.

12. The method of claim 10, further comprising:
   determining that the second bearer was released;
   responsive the determination that the second bearer was released, causing the UE to periodically transmit the report according to the first CSI reporting rate.

13. The method of claim 10, wherein the second QoS level is higher than the first QoS level and the second CSI reporting rate is higher than the first CSI reporting rate.

14. The method of claim 10, wherein detecting the second bearer comprises accessing a context record stored for the UE.

15. The method of claim 10, further comprising:
   determining the first CSI reporting rate based on the first QoS level; and
   responsive to determining the first CSI reporting rate, causing the UE to periodically report CSI to the base station according to the first CSI reporting rate.

16. A base station comprising:
   an antenna structure for communicating over an air interface with a user equipment device (UE), wherein the base station provides connectivity between the UE and a gateway over a bearer; and
   a controller configured to manage communication via the antenna structure over the air interface, wherein the controller is configured to:

(i) serve the UE via the air interface,
(ii) determine a quality of service (QoS) level of the bearer,
(iii) determine a channel state information (CSI) reporting rate based on the determined QoS level, and
(iv) cause the UE to periodically report CSI to the base station according to the selected CSI reporting rate.

17. The base station of claim 16, wherein to select the CSI reporting rate based on the QoS level, the controller is configured to:
   determine, based on the QoS level, whether the bearer is a guaranteed bit rate (GBR) bearer or a non-guaranteed bit rate (non-GBR) bearer;
   responsive to a determination that the bearer is a GBR bearer, select a first CSI reporting rate as the CSI reporting rate; and
   responsive to a determination that the bearer is a non-GBR bearer, select a second CSI reporting rate as the CSI reporting rate, wherein the second CSI reporting rate is different than the first CSI reporting rate.

18. The base station of claim 13, wherein the QoS level comprises a QoS class identifier (QCI) and, to select the CSI reporting rate comprises, the controller is configured to:
   determine the QCI of the bearer; and
   responsive to the determination of the QCI of the bearer, select the CSI reporting rate from among a plurality of CSI reporting rates based on the determined QCI.

* * * * *